UNITED STATES PATENT OFFICE.

GEORGE M. FORMBY, OF JACKSONVILLE, FLORIDA, ASSIGNOR TO FORMBY PETRINITE CORPORATION, OF JACKSONVILLE, FLORIDA, A CORPORATION OF DELAWARE.

PLASTIC COMPOSITION AND PROCESS OF PRODUCING THE SAME.

1,409,939.  Specification of Letters Patent.  Patented Mar. 21, 1922.

No Drawing.  Application filed May 11, 1920.  Serial No. 380,496.

*To all whom it may concern:*

Be it known that I, GEORGE M. FORMBY, a citizen of the United States, residing at Jacksonville, in the county of Duval and State of Florida, have invented certain new and useful Improvements in Plastic Compositions and Processes of Producing the Same; and I do hereby declare the following to be a full, clear, and exact description of the invention, such as will enable others skilled in the art to which it appertains to make and use the same.

This invention relates to cementitious compounds and processes of making the same and has for its object to provide a composition of matter, and a method of producing it, which will be more efficient in action and less costly to employ than those heretofore proposed.

With these and other objects in view, the invention consists in the novel composition of matter, and in the novel steps and combinations of steps constituting the process, all as will be more fully hereinafter disclosed and particularly pointed out in the claims.

In carrying out this invention I may take, for example, proportions of:

Calcium oxide, CaO, not less than ____ 70 lbs.
Magnesium oxide, MgO, not over ____ 2 lbs.
Calcium carbonate, $CaCO_3$, about ____ 2 lbs.
Calcium hydroxide, $Ca(OH)_2$, about 20 lbs.
Magnesium hydroxide, $Mg(OH)_2$, about ____ 6 lbs.

These compounds are thoroughly mixed in the dry state, and I then add sufficient water to form a creamy paste, and heat slowly until the water disappears. The mass is now allowed to cool, and is kept from contact with the air until ready for use, but preferably, it is reduced to a dry powder before storing it away. When it is to be used I finely divide said mass if it is not already in a powdered state, and I stir it slowly into hydrochloric acid, HCl, say of a strength of from 18° Bé.–36° Bé., and until all of said acid is used up. This point will be reached when the mass ceases to give off bubbles and changes from a yellowish to a dark ashy color. At the same time the previously evolved stifling fumes will have ceased.

With one hundred pounds of material as above set forth I would use about two hundred and fifty pounds of hydrochloric acid having a strength of 18° Bé. This mass at first may be said to have about the consistency of thick buttermilk, but after say twenty-four hours settling it separates into a mudlike substance at the bottom, and a supernatant fluid having about the consistency of a lubricating oil, and which will pour about as readily.

The foregoing procedure and composition of matter are or may be substantially the same as disclosed in my copending application No. 364,736 filed March 10, 1920 and entitled Cementitious compounds and processes of making the same.

According to this invention, on the other hand, I add to the liquid oxychloride composition thus produced from 4 to 10 volumes of water and stir in from 5 to 11 volumes of a commercial lime and preferably one containing about 3% of calcium carbonate or which is therefore said to be high in calcium. The mixture thus had is now brought to a boil and allowed to set for 24 hours, when it is ready for various uses, among them that of mixing with plaster of Paris to form a hard stone-like mass, suitable for making a large variety of objects.

The said oxychloride compound if mixed with a substantially equal volume of plaster of Paris, will be found to set without any objectionable contraction or expansion; while by varying the proportion of plaster of Paris the amount of expansion on setting can be varied, and by varying the proportions of the oxychloride compound present, the amount of contraction on setting can be controlled.

I further find by making a pasty cream-like mixture of substantially equal parts of plaster of Paris and said oxychloride compound, and applying this mixture with a brush or by means of a trowel to a plaster of Paris surface, I coat said surface with a layer which is very hard, one which may be readily made smooth and polished, one that is water proof, and one that does not crack on setting nor can it be detached without destroying said surface. In fact, owing to its high plaster of Paris content, it may be said to be integrally welded or fused to said plaster of Paris surface.

The addition of the above mentioned lime to the oxychloride compound of my said copending application, is found to add very materially to the strength of the oxychloride compound of this application, and also to the cements, plasters and other substances, including plaster of Paris, with which the present oxychloride compound may be mixed. The reason for this additional strength is not at present fully understood, but it has been practically demonstrated many times.

The plastic substances composed of the above mentioned oxychloride compound and plaster of Paris may be molded into tiles, artificial stones, and a host of other substances, which may be mixed with coloring material or not as desired. Said substances may also be subjected to various pressure, in which case they take on appearances resembling marble or other stones, according to the coloring matter they contain.

It is obvious that those skilled in the art may vary the foregoing procedure without departing from the spirit of the invention, and therefore, I do not wish to be limited to the above disclosure except as may be required by the claims.

What I claim is:—

1. The process of producing a plastic composition which consists in reacting on calcium hydrate with hydrochloric acid to produce a calcium oxychloride; adding water and lime to said oxychloride; heating the mixture thus produced; and adding plaster of Paris thereto substantially as described.

2. The process of producing a plastic composition which consists in reacting on calcium hydrate mixed with magnesium hydrate with hydrochloric acid to produce a calcium and magnesium oxychloride; adding water and lime to said oxychloride; heating the mixture thus produced; allowing said mixture to set; and adding substantially an equal volume of plaster of Paris thereto, substantially as described.

3. The herein described new article of manufacture the same containing a calcium oxychloride that has been heated with lime in the presence of water, and the compound thus produced mixed with plaster of Paris, substantially as described.

4. The herein described new article of manufacture the same consisting of calcium and magnesium oxychlorides that have been heated in a mixture of lime and water, and the compound thus produced mixed with substantially an equal volume of plaster of Paris, substantially as described.

In testimony whereof I affix my signature.

GEORGE M. FORMBY.